(12) United States Patent
Nemoto (10) Patent No.: US 6,732,842 B2
(45) Date of Patent: May 11, 2004

(54) RATCHET-TYPE LEVER MECHANISM

(75) Inventor: Akira Nemoto, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/290,174

(22) Filed: Nov. 8, 2002

(65) Prior Publication Data

US 2003/0183472 A1 Oct. 2, 2003

(51) Int. Cl.$^7$ .......................... F16D 41/12; F16H 29/02
(52) U.S. Cl. ...................... 192/43.1; 192/48.92; 74/143
(58) Field of Search .......................... 192/43.1, 48.92; 74/141.5, 142, 143; 297/344.12, 344.15; 248/421, 422

(56) References Cited

U.S. PATENT DOCUMENTS

| | | | | |
|---|---|---|---|---|
| 5,865,285 | A | * | 2/1999 | Minkenberg et al. .......... 192/15 |
| 6,178,838 | B1 | * | 1/2001 | Schwarzbich ................ 74/143 |
| 6,464,193 | B1 | * | 10/2002 | Nemoto ....................... 248/421 |
| 6,484,995 | B1 | * | 11/2002 | Nemoto ....................... 248/421 |
| 2003/0222193 | A1 | * | 12/2003 | Nemoto ....................... 248/422 |

FOREIGN PATENT DOCUMENTS

| | | | | |
|---|---|---|---|---|
| JP | 2000255295 | A | * 9/2000 | ............ B60N/2/18 |
| JP | 2001-333830 | A | * 12/2001 | ............ A47C/7/02 |

* cited by examiner

Primary Examiner—Richard M. Lorence
(74) Attorney, Agent, or Firm—Browdy and Neimark (57) ABSTRACT

A ratchet-type lever mechanism including two ratchet gear wheels and a bifurcated ratchet pawl member for selective meshed engagement with one of the two ratchet gear wheels. The bifurcated ratchet pawl member is simply bent from a plate material into such an offset configuration having a first toothed pawl portion and a second toothed pawl portion bent from that first one in an offset manner so that the two pawl portions are in correspondence with the respective two ratchet gear wheels. This ratchet-type lever mechanism has a simplified connection structure allowing both of the bifurcated ratchet member and an operating lever to be securely connected on an input shaft, whereby the input shaft is made short in length, thereby making thin a whole size of the lever mechanism. A restriction element for rotation of the bifurcated ratchet pawl member may also be mounted on that input shaft for that purpose.

13 Claims, 4 Drawing Sheets

RATCHET-TYPE LEVER MECHANISM

BACKGROUND OF INVENTION

1. Field of the Invention

The present invention relates to a ratchet-type lever mechanism for seat lifter (or seat height adjuster), which is operable by rotation of an operation lever to actuate the seat lifter for the height adjustment of seat. Particularly, the invention is directed to a ratchet-type lever mechanism having a ratchet gear system 2. Description of Prior Art A seat height adjuster or what is known as a seat lifter is incorporated in automotive seat to enable an occupant on the seat to selectively adjust the height of seat according to his or her physique and seating posture. In the seat lifter, typically known is a linkage-type seat lifter having forward and rearward links which are interlockingly movable and pivotally coupled with the forward and rearward portions of the seat, respectively, so that the seat may be raised and lowered via those two links. This seat lifter includes plural transmission gears (reduction gears and the like), a brake unit, and a drive mechanism provided with a lever or handle, wherein the drive mechanism is operatively connected through the transmission gears and brake unit to the forward and rearward links. As known in the art, the brake unit provides a braking action on the drive mechanism to normally lock the links to a given position. Conventionally, a ratchet-type lever drive mechanism is disclosed in the Japanese Laid-Open Patent Publication No. 2000-255295, for instance. According thereto, an operating lever is connected with two ratchet pawl gears, and two ratchet wheel gears are fixed to the output shaft of the brake unit, such that, by vertical rotation of the operating lever, one of the two pawl gears may be selectively meshed with a corresponding one of the two ratchet wheel gears, thereby causing upward and downward motions of the seat lifter to raise and lower a seat to a desired level. The ratchet-type lever mechanism includes a pair of first and second ratchet wheel gears fixed to the shaft of brake unit, and a ratchet gear member having a pair of first and second toothed ratchet pawls extend continuously from the circumferential side thereof in an offset fashion with respect thereto, such that those two toothed ratchet are distant from each other by a certain central angle with respect to the central axis of ratchet gear member. The first ratchet wheel gear has a known one-way clutch built therein, by which the gear itself is only permitted to rotate together with the shaft of brake unit in clockwise direction to cause upward motion of the seat lifer, while being free to rotate about the brake unit shaft in anticlockwise direction. On the other hand, the second ratchet wheel gear has another one-way clutch therein for only permitting the gear itself together with the brake unit shaft to rotate in anticlockwise direction to cause downward motion of the seat lifter, while being free to rotate about the brake unit shaft in clockwise direction. Accordingly, with this conventional mechanism, upward rotation of the operation lever brings the first toothed ratchet pawl to meshed engagement with the first ratchet wheel gear, thereby causing upward motion of seat lifer to raise a seat. Conversely, downward rotation of the lever brings the second toothed ratchet pawl to meshed engagement with the second ratchet wheel gear, thereby causing downward motion of seat lifter to lower the seat.

In this prior art, the ratchet gear member is formed by casting into an integral one configuration including the first and second toothed ratchet pawls which are integral with the body of the ratchet gear member. Specifically, in the casting process, separate base materials for casting, such as a rotary shaft base material and two ratchet pawl base materials, are placed in casting dies and subjected to molding together therein, thereby producing one integral piece of ratchet gear member with two toothed ratchet pawls. However, this has been found defective because it involves complicated steps and increased costs, and also because the casting often creates different sizes of each resulting cast part, which will result in decreased productivity and increased costs. Further, in this sort of lever mechanism, a relatively long splined connection shaft is required for sufficient spline connection of the operating lever with such relatively thick cast ratchet gear member. But, in most cases, such lever mechanism has to be provided on the lateral wall of seat cushion and a quite small spacing is given between that seat cushion lateral wall and a door of vehicle. Consequently, there is a need to reform a local part of the seat cushion lateral wall to avoid undesired contact of the lever mechanism with the door, which also results in a poor productivity and increased costs.

SUMMARY OF THE INVENTION

In view of the above-stated drawbacks, it is a purpose of the present invention to provide an improved ratchet lever mechanism which is simplified in structure and is thin in thickness, thus allowing the mechanism per se to be installed in a narrow space between the lateral side of vehicle seat and a door of vehicle.

In order to achieve such purpose, a ratchet lever mechanism in accordance with the present invention is basically comprised of:

an output shaft element rotatably provided in the ratchet-type lever mechanism;

a ratchet gear wheel means rotatably provided in the ratchet-type lever mechanism, which includes a first ratchet gear wheel and a second ratchet gear wheel, wherein each of the first and second ratchet gear wheels has one-way clutch means built therein, with such an arrangement that the first ratchet gear wheel is to be locked to the output shaft element in a normal direction for rotation therewith, while being allowed to rotate in a reverse direction, and that the second ratchet gear wheel is to be locked to the shaft element in said reverse direction, while being allowed to rotate in the normal direction;

an input shaft element rotatably supported in the ratchet-type lever mechanism;

a ratchet pawl element so formed from a plate material to have: a flat body portion; a first toothed pawl portion; and a second toothed pawl portion, wherein the first and second toothed pawl portions extend from the flat body portion in a spaced-apart manner, such that the second toothed pawl portion is bent from the first toothed pawl portion in an offset relation with respect to the body portion;

the first and second toothed ratchet pawl portions being disposed in correspondence with the respective first and second ratchet gear wheels; and a connecting means for connecting the ratchet pawl member to the input shaft element, which connecting means is defined in the input shaft element and the ratchet pawl member.

In one aspect of the present invention, the connecting means may comprise an uneven portion defined in the input shaft element; and an unevenly shaped hole formed in the ratchet pawl member. The ratchet pawl member may be connected to the input shaft element by engaging the unevenly shaped hole of ratchet pawl member about the uneven portion of input shaft element.

In another aspect of the invention, an operating lever is firmly attached to the input shaft element, and the connecting means may include a two-point connecting means for not only connecting the operating lever to the input shaft element at one point, but also connecting the operating lever to the ratchet pawl member at another point.

Other various structural features and advantages will become apparent from reading of the descriptions hereinafter, with reference to the annexed drawings.

DETAILED DESCRIPTION OF PREFERRED EMBODIMENT OF THE INVENTION

Referring to FIGS. 1 through 7, there are illustrated exemplary embodiments of ratchet-type lever mechanism for a seat lifter (not shown), as generally designated by (10), in accordance with the present invention.

Referring now to FIGS. 1 to 4, one exemplary mode of the ratchet-type lever mechanisms generally designated by (10) will be described. As can be seen from FIGS. 3 and 4, the mechanism (10) is provided as one unit having a base plate (24) and a housing cover (26), in which principal mechanical elements to be described are collectively accommodated.

The base plate (24) is formed with a first bearing hole (24h-1) and a second bearing hole (24h-2) therein. Also, the housing cover (26) is formed with first and second bearing holes (26h-1) and (26h-2) which are respectively in correspondence with the two bearing holes (24h-2) (24h-2). Designation (14) denotes an output shaft having a connection hole adapted to be connected with a brake unit (not shown) which is operatively connected with a seat lifter (not shown), for instance. The output shaft (14) has a circular connecting portion (14a), a bearing shaft portion (14c) and a partition flange (14b) formed between the circular connecting portion (14a) and bearing shaft portion (14c). Though not shown, the bearing shaft portion (14c) may be formed with serration or splines for connection purpose to be set forth later.

Likewise in the prior art, a pair of known first and second ratchet gear wheels (12-u) (12-d), each incorporating the one-way clutch (12a), are used in this particular mode. The first and second ratchet gear wheels (12-u) (12-d) are limited by their own one-way clutches (12a) (12a) as to their respective rotation directions. That is, as understandable from the arrows in FIG. 3, due to its one-way clutch (12a), the first ratchet gear wheel (12-u) is rotatable together with the output shaft (14) only in anticlockwise direction, while being free to rotate about the shaft (14) in clockwise direction. On the other hand, due to its one-way clutch (12a), the second ratchet gear wheel (12-d) is rotatable together with the output shaft (14) only in clockwise direction, while being free to rotate about the shaft (14) in anticlockwise direction.

The first and second ratchet gear wheels (12-u) (12-d) are at their respective one-way clutches (12a) (12a) firmly connected with the bearing shaft portion (14c) of output shaft (14) (preferably via spline connection).

In accordance with the present invention, generically stated, there is provided a bifurcated ratchet pawl member (18) which is formed by press working from a flat bifurcated metallic plate material into the illustrated deformed shape, and a connecting means for connecting the ratchet pawl member (18), including related elements to be set forth, with an operating lever (20).

In the embodiment shown in FIGS. 1 to 4, the bifurcated ratchet pawl member (18) is provided, which is formed by press working process from a flat bifurcated metallic plate material into the illustrated shape including a body portion (28) and a pair of first and second toothed pawl portions (28a–u) (28a–d) extending continuously from the body portion (28), wherein the first toothed pawl portion (28a–u) extends horizontally from the body portion (28) in one rectilinear direction, terminating in a gear teeth (16-u), whereas on the other hand, the second toothed pawl portion (28a–d) is spaced apart from the first toothed pawl portion (28a–u) and is so bent as to extend in a rectilinear direction in parallel with that one rectilinear direction associated with the first toothed pawl portion (28a–u). This second toothed pawl portion (28a–d) terminates in a gear teeth (16-d). Hence, the two toothed pawl portions (28a–u) (28a–d) are in an offset relation with respect to the body portion (28). As the aforementioned connecting means, such unevenly shaped hole as a serrated or splined connecting hole (30) may be formed in the arcuate body portion (28).

Accordingly, there is no need to use the conventional complicated casting process to form one configuration of this particular shape of ratchet pawl member, the casting process including the steps of placing a shaft base material and two ratchet pawl base materials in casting dies and subjecting them to molding together therein. In the present invention, one flat plate material of bifurcated shape can be easily formed by press working process into the illustrated offset shape of bifurcated ratchet pawl member (18) wherein the two toothed pawl portions (28a–u) (28a–d) are in an offset relation with respect to the flat body portion (28). Thus, it is possible to procure the ratchet pawl member in desired size with a great precision and at low costs, in contrast to the conventional casting process.

Figure 2:
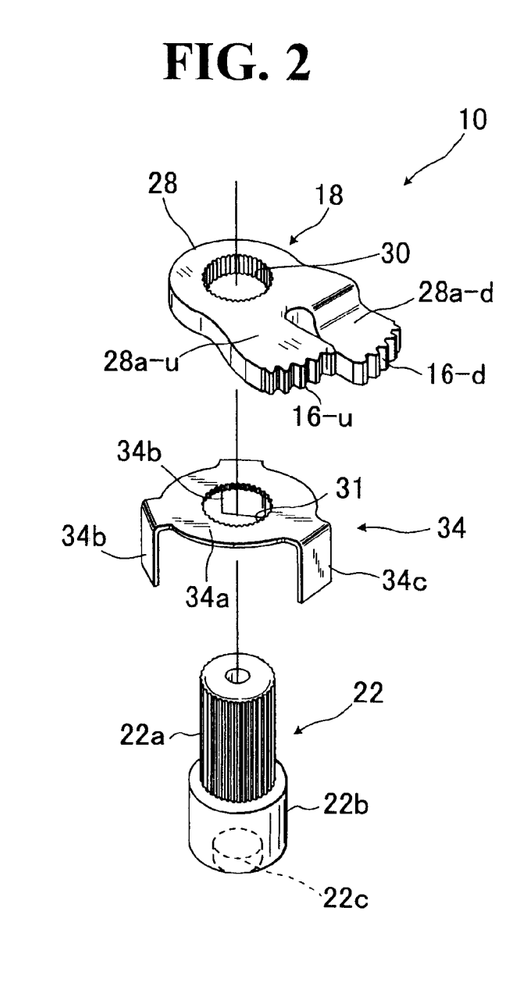
FIG. 2 is a perspective view showing a bifurcated ratchet pawl element, a restriction member, and an input shaft, which are associated with such one mode of ratchet-type lever mechanism.

Further, in this embodiment, there is provided a restriction member (34) which serves to restrict rotation of the bifurcated ratchet pawl member (18) and bias it in one direction by a biasing spring to be explained later. The restriction member (34) includes an annular plate portion (34a), one vertical lug (34c) and a pair of vertical lugs (34b), wherein those lugs (34c) (34b) continuously extend from the annular plate portion (34a) in a vertical direction, as best seen in FIG. 2. In this respect, as the foregoing connection means, a suitable unevenly-shaped hole, such as a serrated connecting hole (31), may be formed in the annular plate portion (34a). It is noted that the serrated connecting hole (31) is equal in diameter and serration pitches to the splined connecting hole (30).

Designation (22) denotes an input shaft. In this input shaft (22), an unevenly shaped portion, such as a splined small-diameter portion (22a), may be formed as the foregoing connection means, and a large-diameter portion (22b) be formed integrally together with such small-diameter portion (22a). Such splined small-diameter portion (22a) is equal in diameter and serration pitches to the both of the afore-said two connecting holes (30) (31). A shaft piece (22c) is formed integrally in the end surface of the large-diameter portion (22b) and projects therefrom.

Figure 1:
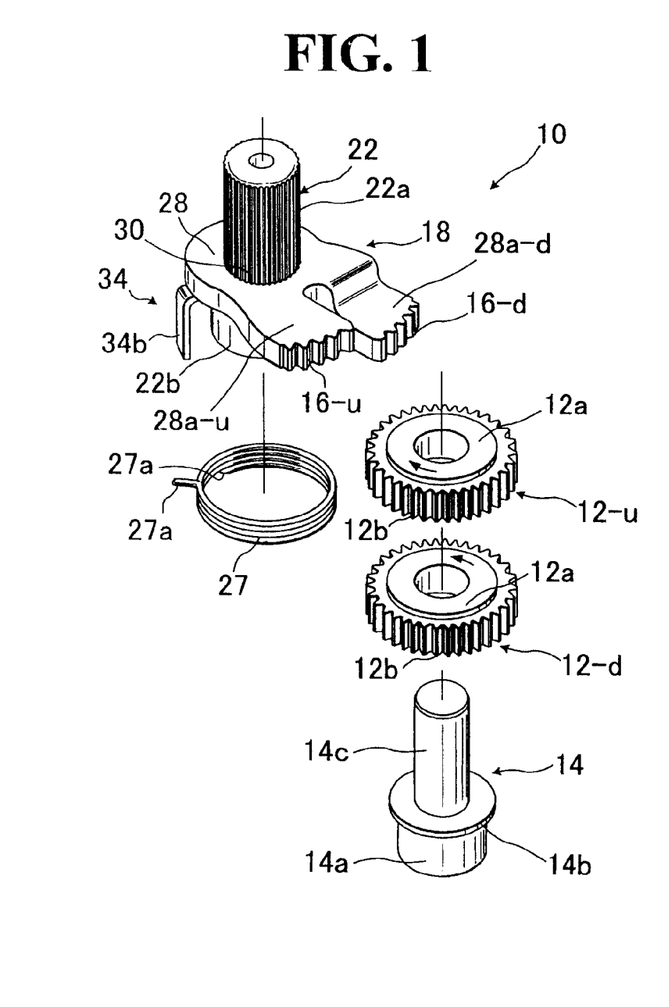
FIG. 1 is a exploded perspective view of a principal part of one mode of ratchet-type lever mechanism in accordance with the present invention.

As understandable from FIGS. 1 and 2, the splined small-diameter portion (22a) is inserted and meshed in both two connecting holes (30) (31), after which, an annular spring (27) is attached about the large-diameter portion (22b).

In assembly, at first, a free end of the bearing shaft portion (14c) of output shaft (14), about which are secured the first and second ratchet gear wheels (12-u) (12-d) via splined connection or the like, is rotatably fitted in the second bearing hole (26h-2) of housing cover (26). Then, the splined small-diameter portion (22a) is rotatably fitted in the first bearing hole (26h-1) such that most of the free end portion of the former (22a) projects outwardly from the latter (26h-1). At this moment, the first and second toothed pawl portions (28a–u) (28a–d) are disposed in correspondence with the first and second ratchet gear wheels (12-u) (12-d), respectively. But, under such state, those two toothed pawl portions (28a–u) (28a–d) are disposed at a neutral point where they are out of meshed engagement with the two ratchet gear wheels (12-u) (12-d), as best seen from FIG. 3. Thereafter, the base plate (24) is securely attached to the housing cover (26) as understandable from FIGS. 3 and 4, such that the shaft piece (22c) of output shaft (22) is rotatably inserted in the first bearing hole (24h-1) of the base plate (24), while at the same time, the circular connecting portion (14a) of output shaft (14) is rotatably supported in the second bearing hole (24h-2) of base plate (24). Hence, the two ratchet gear wheels (12-u) (12-d) are rotatably journalled between the base plate (24) and housing cover (26) so as to be rotatable in their respective corresponding directions of rotation as stated previously. As shown, the two ends (27a) (27a) of the circular spring (27) are respectively abutted against the two projected pieces (24a) (24a) formed on the base plate (24), whereby the sector gear element (31) is normally biased by the spring (44) to a neutral point where the first and second toothed pawl portions (28a–u) (28a–d) are both out of engagement with the two respective first and second ratchet gear wheels (12-u) (12-d).

Designations (36) (36) denote a pair of stopper pieces which are so formed in the base plate (24) as to be disposed on an arcuate path along which the lug (34c) is to be rotated about the axis of the input shaft (22), thereby serving to limit the rotation range of the ratchet pawl member (18), as will be explained later.

Figure 3:
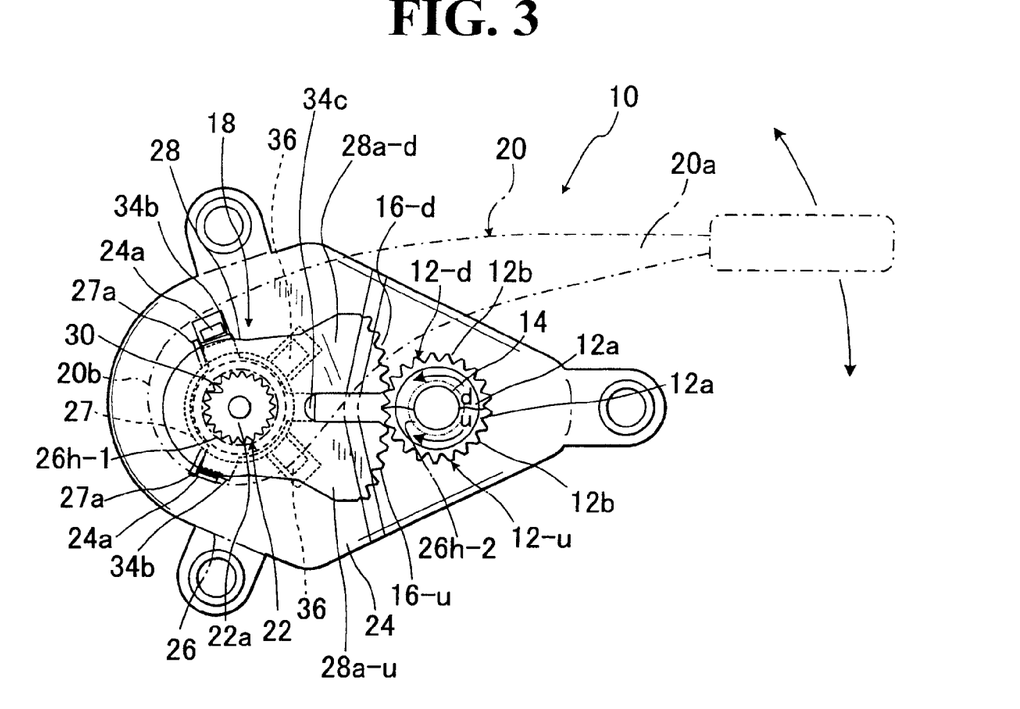
FIG. 3 is a schematic plan view showing a whole of the ratchet-type lever mechanism.
Figure 4:
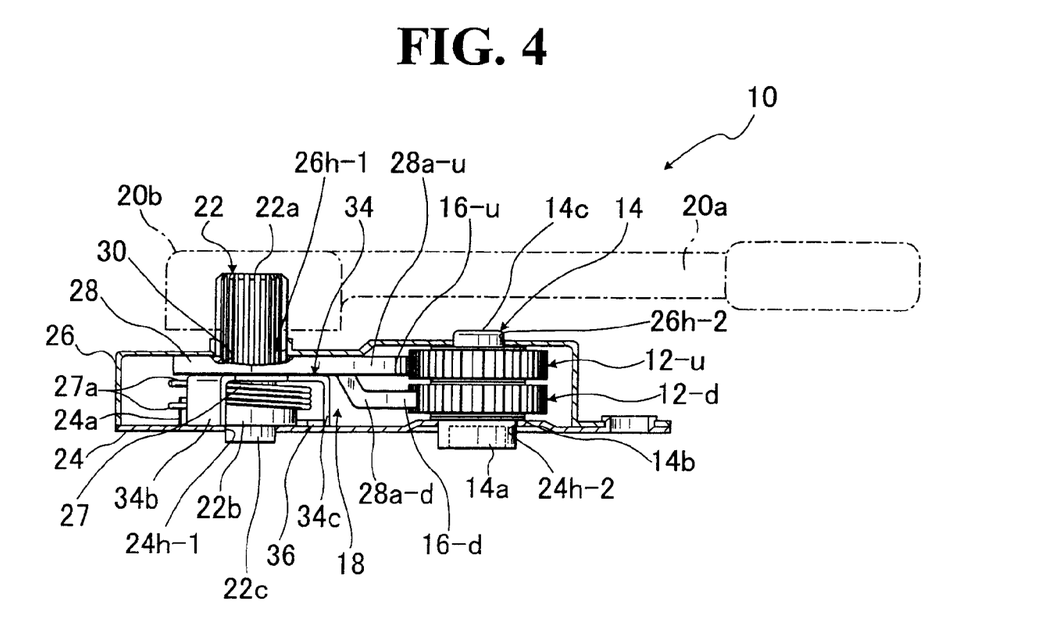
FIG. 4 is a sectional view of the ratchet-type lever mechanism shown in FIG. 3.

As seen from FIG. 3, the two lugs (34a) (34a) are normally disposed in the position where they are aligned with those two projected pieces (24a) (24a), respectively.

In that manner, there is produced one unit of lever mechanism which can be readily secured at the circular connection portion (14a) thereof to a drive shaft of brake unit or the like which is connected with a seat lifter of a vehicle seat, for instance.

As indicated by the one-dot chain lines, an operating lever (20) is provided, which has one free end portion (20a) and a base connection portion (20b), This operating lever (20) is firmly connected at its base connection portion (20b) to the splined small-diameter portion (22a) of input shaft (22).

Accordingly, it is appreciated that such thin plate-like material as the ratchet pawl member (18) and restriction member (34) are attached about the input shaft (22) and the two plate body portions (28) (34a) respectively of the pawl and restriction members (18) (34) are juxtaposed with each other, so that the input shaft (22) is formed in a relatively short size in contrast to the previously stated conventional cast ratchet pawl member having a relatively thick body which requires forming a relatively long input shaft. Thus, it is possible to not only shorten the length of the input shaft (22), but also make thin the thickness of whole casing formed by the base plate (24) and housing cover (26), which means that the lever mechanism (10) can be installed in a narrow space between a vehicle seat and door of vehicle.

In operation, when the operating lever (20) is rotated upwardly as indicated by the upward arrow, the input shaft (14) is simultaneously rotated anticlockwise, thereby causing anticlockwise rotation of both ratchet pawl member (18) and restriction member (34) about the axis of output shaft (22). At this moment, it is seen that one lug (34b) of the restriction member (34) pushes the corresponding end (27a) of the spring (27), overcoming the biasing force of the spring (27), and that another lug (34c) of the restriction member (34) is rotated in the anticlockwise direction toward the corresponding one of the two stopper pieces (36). Thus, the first toothed pawl portion (28a–u) is brought to meshed engagement with the first ratchet gear wheel (12-u). With further upward rotation of the operating lever (20), the first ratchet gear wheel (12-u) is rotated clockwise in the arrow direction (u), causing the output shaft (14) to rotate clockwise until such another lug (34c) is brought to contact with the corresponding one of the two stopper pieces (36).

Of course, in brief, downward rotation of the operating lever (20) causes clockwise rotation of the input shaft (14) and simultaneous clockwise rotation of the both ratchet pawl member (18) and restriction member (34), thereby bringing the second toothed pawl portion (28a–d) to meshed engagement with the second ratchet gear wheel (12-d). And, with further downward rotation of operating lever (20), the second ratchet gear wheel (12-d) is rotated anticlockwise in the arrow direction (d), causing the output shaft (14) to rotate anticlockwise until the foregoing one lug (34b) is brought to contact with another corresponding one of the two stopper pieces (36).

Figure 5:
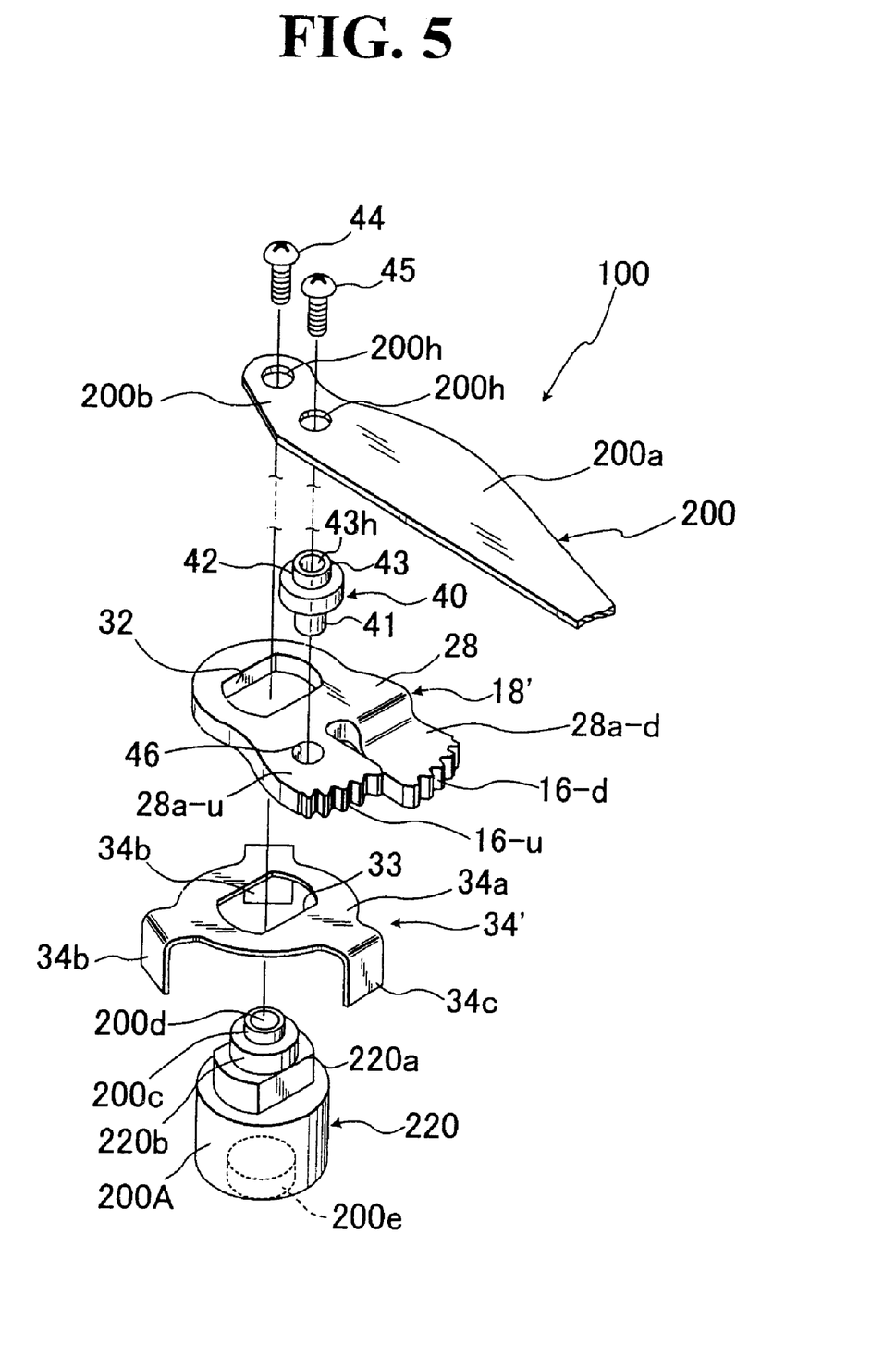
FIG. 5 is a partly broken, exploded perspective view showing a principal part of another alternative mode of ratchet-type lever mechanism.
Figure 6:
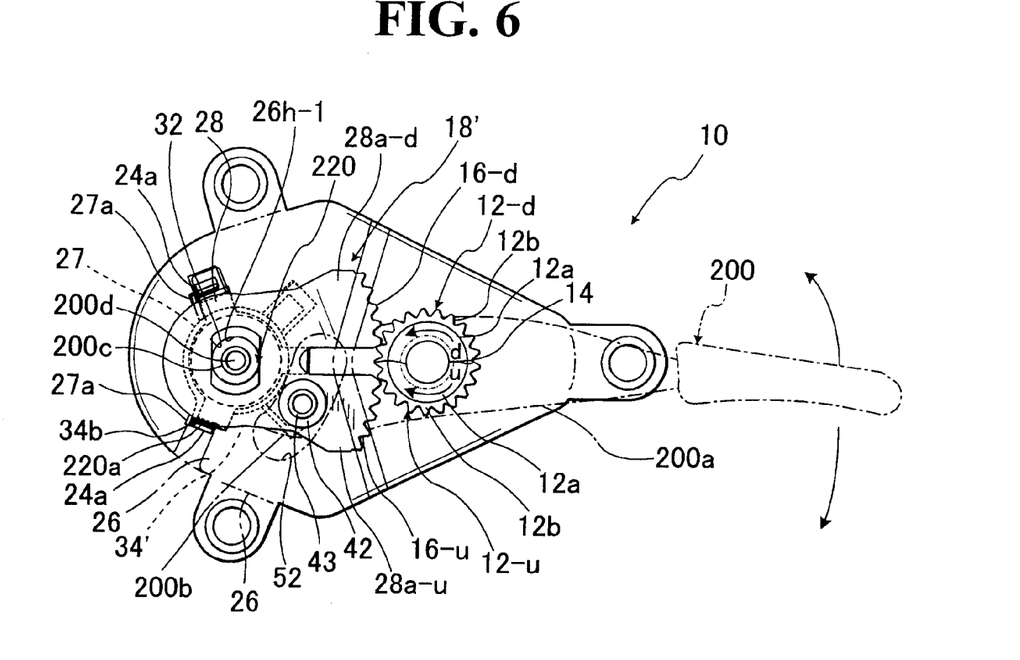
FIG. 6 is a schematic plan view showing a whole of such another mode of ratchet-type lever mechanism.
Figure 7:
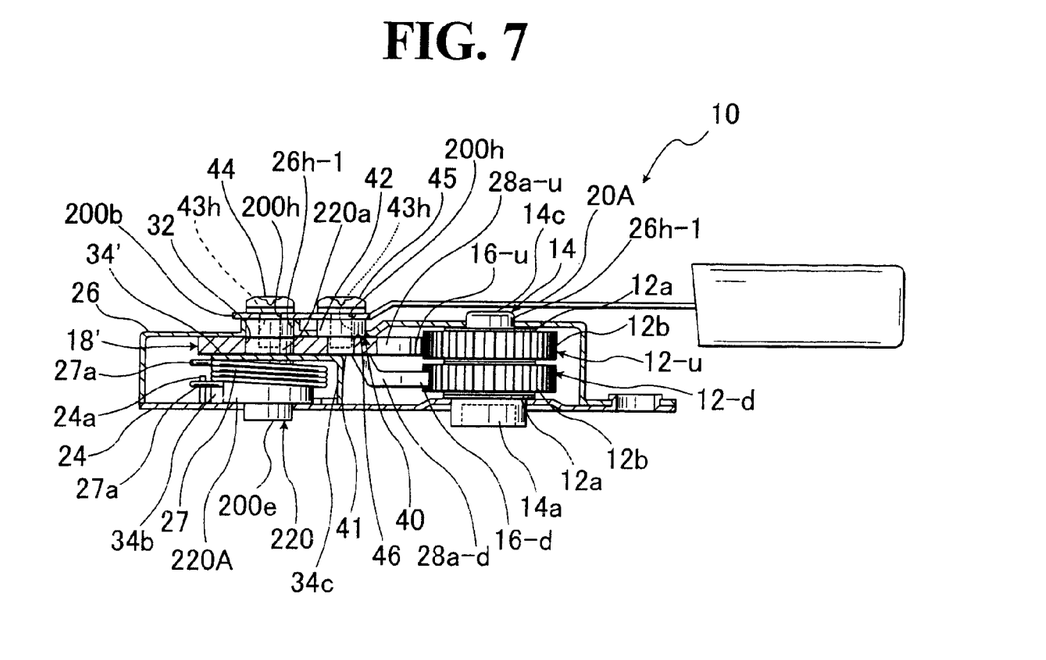
FIG. 7 is a sectional view of the ratchet-type lever mechanism shown in FIG. 6.

Referring to FIGS. 5 to 7, a second alternative mode of the ratchet-type lever mechanism (100) will now be described.

As can be seen from FIG. 6, the illustrated second mode of mechanism (100) is basically similar in construction to the above-described first mode, only excepting the following points: (i) There are provided a modified input shaft (220) and another mode of connection means for connecting the input shaft (220) to the restriction member (34), ratchet pawl member (18) and operating lever (200), and (ii) an arcuate guide hole (52) is formed in the housing cover (26). Therefore, all like designations to be used hereinafter correspond to all like designations that have been given above, and further description is omitted about the common elements between the first and second modes for the sake of simplicity.

According to the present invention, as best shown in FIG. 5, the connecting means provides a non-circular connection means among the input shaft (220), restriction member (34) and ratchet pawl member (18), and also provides a two-point connection means between the ratchet pawl member (18) and operating lever (200). Specifically, the non-circular connecting means may be embodied in a suitable unevenly shape. In the illustrated embodiment, the non-circular connecting means comprises: a non-circular connection hole (32) formed in the flat body portion (28) of the ratchet pawl member (18); a non-circular connection hole (33) formed in the flat body portion (34a) of the restriction member (34); and a non-circular connection portion (220a) formed in the input shaft (220). On the other hand, the two-point connection means may be embodied by: a connection hole (220d) formed in one end of the input shaft (220); a connection hole (46) formed in the first ratchet pawl portion (28a–u) of ratchet pawl member (18); a pair of connection holes (200h) (200h) formed in the base end portion (200b) of the operating lever (200); and a connecting pin element (40). It is noted that both two non-circular connection holes (32) (33) are equal in size to each other and the non-circular connection portion (220a) is generally equal in size to those two non-circular connection holes (32) (33).

As shown, formed integrally in one end surface of the columnar body portion (200A) of the input shaft (220) are the afore-said non-circular connection portion (220a) on which a large-diameter columnar connection portion (220b) is formed integrally. Further, a small-diameter connection portion (200c) is formed integrally upon that large-diameter columnar connection portion (220b), having a threaded hole (200d) formed therein. A shaft piece (200e) is formed integrally in another opposite end surface of the columnar body portion (200A) of input shaft (220). The connecting pin element (40) comprises a circular body portion (43), a first pin portion (42) formed in one end surface of the circular body portion (43), the first pin portion (42) having a threaded hole (43h) formed therein, and a second connection portion (41) formed in another opposite end surface of the circular body portion (43).

Now, description will made only of how to mount the above-described second mode of connecting means and the associated elements to the base plate (24) and housing cover (26), with reference to FIGS. 5 to 7, because other portions of the present second embodiment are identical in construction and assembly to the previously described first embodiment shown in FIGS. 1 to 4.

As indicated in FIG. 5, at first, the restriction member (34) is securely attached to the input shaft (220) by engaging the non-circular connection hole (33) of the former (34) about the non-circular connection portion (220a) of the latter (220). Then, likewise, the ratchet pawl member (18) is securely attached to the input shaft (220) by engaging the non-circular connection hole (32) of the former (18) about the non-circular connection portion (220a) of the latter (220). Thereafter, the shaft piece (200e) of the input shaft (220) is rotatably fitted in the first bearing hole (24h-1) of the base plate (24), and then, the housing cover (26) is securely attached to the base plate (24) such that the circular portion (220b) is rotatably fitted in the first bearing hole (26h-1) of the housing cover (26). Next, the connecting pin element (40) is first fastened to one hole (200h) of the operating lever (200) by inserting the first pin portion (43) into such one hole (200h) and threadedly engaging a securing screw (45) into the threaded hole (43h) of first pin portion (43). Then, the second pin portion (41) of connecting piece (40) is inserted through the arcuate guide hole (52) and rotatably fitted in the hole (46) associated with the ratchet pawl member (28), so that the circular body portion (43) of connecting piece (40) is slidably fitted in the arcuate guide hole (52). Finally, another securing screw (44) is inserted through another hole (200h) of operating lever (200) and threadedly engaged in the threaded hole (200d) of the input shaft (220). Here, it is to be appreciated that the arcuate guide hole (52) is formed along the circumference of a circle having a center at the central axis of the input shaft (220), which effectively allows sliding movement of the connecting piece (40) along that particular arcuate guide hole (54), thereby allowing the bifurcated ratchet pawl member (18) to be rotated clockwise and anticlockwise by rotation of the operating lever in the arrow directions of FIG. 6.

The operation of the present second mode of lever mechanism (100) may be effected in the same way as described in the previously explained first mode, and therefore, description is eliminated for the sake of simplicity.

From the descriptions above, it is appreciated that, in accordance with the present, the following remarkable advantages and effects are obtained.

(i) No need to use the conventional complicated casting process to form one configuration of this particular shape of ratchet pawl member. That is, one plate material of bifurcated shape can be easily formed by press working into the illustrated offset bifurcated ratchet pawl member wherein the two toothed pawl portions are in an offset relation with respect to the flat body portion. It is therefore easily possible to form the ratchet pawl member in a desired size with great precision and at low costs, in contrast to the conventional casting process.

(ii) The major elements, i.e. the ratchet pawl member (18) and restriction member (34), are of a thin plate material. They are juxtaposed with each other and collectively provided on the connecting means (e.g. at 30, 31, 22, 33, 32, 220a, 40, 200h). Hence, the input shaft (22 or 220) is formed in a relatively short size in contrast to the previously stated conventional cast ratchet paw member having a relatively thick body which requires forming a relatively long input shaft. Thus, it is possible to not only shorten the length of the input shaft (22 or 220), but also make thin the thickness of whole casing formed by the base plate (24) and housing cover (26), which means that the lever mechanism (10 or 110) can be installed in a narrow space between a vehicle seat and door of vehicle.

Finally, it should be understood that the present invention is not limited to the illustrated embodiment, but any other modification, replacement and addition may be structurally applied thereto without departing from the scopes of the appended claims.

What is claimed is:

1. A ratchet-type lever mechanism comprising:
   an output shaft element rotatably provided in said ratchet-type lever mechanism;
   a ratchet gear wheel means rotatably provided in said ratchet-type lever mechanism; said ratchet gear wheel means including a first ratchet gear wheel and a second ratchet gear wheel, wherein each of said first and second ratchet gear wheels has one-way clutch means built therein, with such an arrangement that said first ratchet gear wheel is to be locked to said output shaft element in a normal direction for rotation therewith, while being allowed to rotate in a reverse direction, and that said second ratchet gear wheel is to be locked to said output shaft element in said reverse direction, while being allowed to rotate in said normal direction;
   an input shaft element rotatably supported in said ratchet-type lever mechanism;

a ratchet pawl member so formed from a plate material to have: a flat body portion; a first toothed pawl portion; and a second toothed pawl portion, wherein said first and second toothed pawl portions extend from said flat body portion in a spaced-apart manner, such that said second toothed pawl portion is bent from said first toothed pawl portion in an offset relation with respect to said body portion;

said first and second toothed pawl portions being disposed in correspondence with the respective said first and second ratchet gear wheels; and a connecting means for connecting said ratchet pawl member to said input shaft element, said connecting means being defined in said input shaft and ratchet pawl elements.

2. The ratchet-type lever mechanism as claimed in claim 1, wherein an operating lever is firmly attached to said input shaft element.

3. The ratchet-type lever mechanism as claimed in claim 1, wherein an operating lever is firmly attached to said input shaft element, and wherein a biasing means is provided to normally bias both said ratchet pawl member and said operating lever in a direction to a neutral point where said first and second toothed pawl portions are both out of engagement with the respective said first and second ratchet gear wheels.

4. The ratchet-type lever mechanism as claimed in claim 1, wherein said connecting means comprises: an uneven portion defined in said input shaft; and an unevenly shaped hole formed in said ratchet pawl member, and wherein said ratchet pawl member is connected to said input shaft by engaging said unevenly shaped hole of the ratchet pawl member about said uneven portion of the input shaft element.

5. The ratchet-type lever mechanism according to claim 4, wherein said uneven portion and said unevenly shaped hole are formed in a splined or serrated manner.

6. The ratchet-type lever mechanism according to claim 4, wherein said uneven portion and said unevenly shaped hole are formed in a non-circular manner.

7. The ratchet-type lever mechanism as claimed in claim 1, wherein an operating lever is firmly attached to said input shaft element, and wherein said connecting means includes a two-point connecting means for not only connecting said operating lever to said input shaft element at one point, but also connecting said operating lever to said ratchet pawl member at another point.

8. A ratchet-type lever mechanism comprising:

a housing means;

an output shaft element rotatably provided in said housing means;

a ratchet gear wheel means rotatably provided in said housing means; said ratchet gear wheel means including a first ratchet gear wheel and a second ratchet gear wheel, wherein each of said first and second ratchet gear wheels has one-way clutch means built therein, with such an arrangement that said first ratchet gear wheel is to be locked to said output shaft element in a normal direction for rotation therewith, while being allowed to rotate in a reverse direction, and that said second ratchet gear wheel is to be locked to said output shaft element in said reverse direction, while being allowed to rotate in said normal direction;

an input shaft element rotatably supported in said housing means;

a ratchet pawl member so formed from a plate material to have: a flat body portion; a first toothed pawl portion; and a second toothed pawl portion, wherein said first and second toothed pawl portions extend from said flat body portion in a spaced-apart manner, such that said second toothed pawl portion is bent from said first toothed pawl portion in an offset relation with respect to said flat body portion;

said first and second toothed pawl portions being disposed in correspondence with the respective said first and second ratchet gear wheels; and a connecting means for connecting said ratchet pawl member to said input shaft element, said connecting means being defined in said input shaft element and said flat body portion of said ratchet pawl member.

9. The ratchet-type lever mechanism as claimed in claim 8, wherein said connecting means comprises: an uneven portion defined in said input shaft element; and an unevenly shaped hole formed in said ratchet pawl member, and wherein said ratchet pawl member is connected to said input shaft element by engaging said unevenly shaped hole of the ratchet pawl member about said uneven portion of the input shaft element.

10. The ratchet-type lever mechanism as claimed in claim 8, which further comprises: a restriction means for restricting rotation of said ratchet pawl member, said restricting means including: a restriction element so formed from a plate material as to have a flat body portion and at least one lug extending from said flat body portion; and a pair of stopper pieces formed in said housing means, with such an arrangement that rotation of said input shaft element brings one of said at least one lug of said restriction element to contact with a selected one of said pair of stopper pieces associated with said restriction means, thereby restricting rotation range of said first and second toothed pawl portions with respect to said first and second toothed gear wheels.

11. The ratchet-type lever mechanism as claimed in claim 8, wherein an operating lever is firmly attached to said input shaft element, wherein a biasing means is provided to normally bias both said ratchet pawl member and said operating lever in a direction to a neutral point where said first and second toothed pawl portions are both out of engagement with the respective said first and second ratchet gear wheels, wherein said biasing means comprises a circular spring having a pair of ends, said circular spring being attached about said connecting means, wherein a restriction means is provided for restricting rotation of said rachet pawl member, said restricting means including: a restriction element so formed from a plate material as to have a flat body portion and at least three lugs extending from said flat body portion and a pair of stopper pieces formed in said housing means, with such an arrangement that rotation of said input shaft element brings one of said at least three lugs of said restriction element to contact with one of said pair of stopper pieces associated with said restriction means, thereby restricting rotation range of said first and second toothed pawl portions with respect to said first and second toothed ratchet gear wheels, and wherein said two ends of said circular spring are respectively contacted with another two of said at least three lugs of said restriction elements.

12. The ratchet-type lever mechanism as claimed in claim 8, wherein the ratchet-type lever mechanism includes an operating lever disposed outside said housing means, wherein said connecting means includes a two-point connecting means for not only connecting said operating lever to said input shaft element at one point, but also connecting said operating lever to said ratchet pawl member at another point, wherein said two-point connecting means comprises:

a first connecting means for connecting said operating lever to said input shaft element, said first connecting means comprising: a threaded hole portion formed in said input shaft element; a first hole formed in said operating lever; and a securing screw which is inserted through said first hole and further threadedly engaged in said threaded hole, thereby securely connecting said operating lever with said input shaft element; and a second connecting means for connecting said operating lever to said ratchet pawl member, said second connecting means comprising: a connecting piece having a threaded hole portion formed in one end thereof; a projection portion formed in another end thereof; a body portion defined between said threaded hole portion and said projection portion; a second hole formed in said operating lever; a hole formed in said ratchet pawl member, and a securing screw, wherein said securing screw is inserted through said second hole and threadedly engaged in said threaded portion, while said projection portion is rotatably inserted in said hole of the ratchet pawl member, so that said operating lever is connected, via said connecting piece, with said ratchet pawl member.

13. The ratchet-type lever mechanism as claimed in claim 12, wherein said housing means has: a hole in which said threaded hole portion of said input shaft element is rotatably supported; and an actuate hole extending along a circumference of circle whose center is at said input shaft element, and wherein said body portion of said connecting piece is slidably inserted in said arcuate hole.

* * * * *